United States Patent [19]

Carvalko et al.

[11] 4,118,634
[45] Oct. 3, 1978

[54] DEVELOPER SOLUTION LEVEL DETECTOR

[75] Inventors: Joseph R. Carvalko, Bethel; Robert J. Tolmie, Jr., Fairfield, both of Conn.

[73] Assignee: Pitney-Bowes, Inc., Stamford, Conn.

[21] Appl. No.: 756,512

[22] Filed: Jan. 3, 1977

[51] Int. Cl.² .......................................... G01N 21/26
[52] U.S. Cl. .................................. 250/577; 356/208; 73/293
[58] Field of Search ............... 250/227, 573, 574, 577; 73/290, 293; 356/208

[56] References Cited

U.S. PATENT DOCUMENTS

| | | | |
|---|---|---|---|
| 3,548,657 | 12/1970 | Panerai et al. | 73/293 |
| 3,551,670 | 12/1970 | Topol et al. | 356/208 |
| 3,734,629 | 5/1973 | Griffiths et al. | 250/573 |
| 3,819,278 | 6/1974 | Muller | 356/208 |
| 3,851,181 | 11/1974 | Hedle | 250/577 |

Primary Examiner—David C. Nelms
Attorney, Agent, or Firm—Martin D. Wittstein; William D. Soltow, Jr.; Albert W. Scribner

[57] ABSTRACT

A device for indicating when the level of developer solution in an electrostatic photocopying machine falls to a predetermined level comprises a source of light and a photosensor on which the light source is focused. The photosensor generates a light intensity signal that is related in a known way to the magnitude of light incident on it. Both the light source and photosensor are mounted in a housing, which has a bottom formed to rest firmly on the bottom of the tank that holds the developer solution, and, therefore, are mounted in fixed, spaced relation relative to each other as well as to the housing bottom. A bracket, which includes a spring, supports the housing in the developer solution tank with the housing and tank bottoms in firm interengagement to establish the predetermined developer solution level equal to the distance between the tank bottom and photosensor. A reference signal generator generates a reference signal that is related in an arbitrary way to the light intensity signal generated by the photosensor when the developer solution in the tank is at the predetermined level. Both the photosensor and reference signal generator are connected to a comparator that generates an output signal to indicate if the light intensity signal is greater or less than the reference signal. A visual or aural indicator is responsive to the output signal to indicate that the developer solution has fallen to the predetermined level.

19 Claims, 7 Drawing Figures

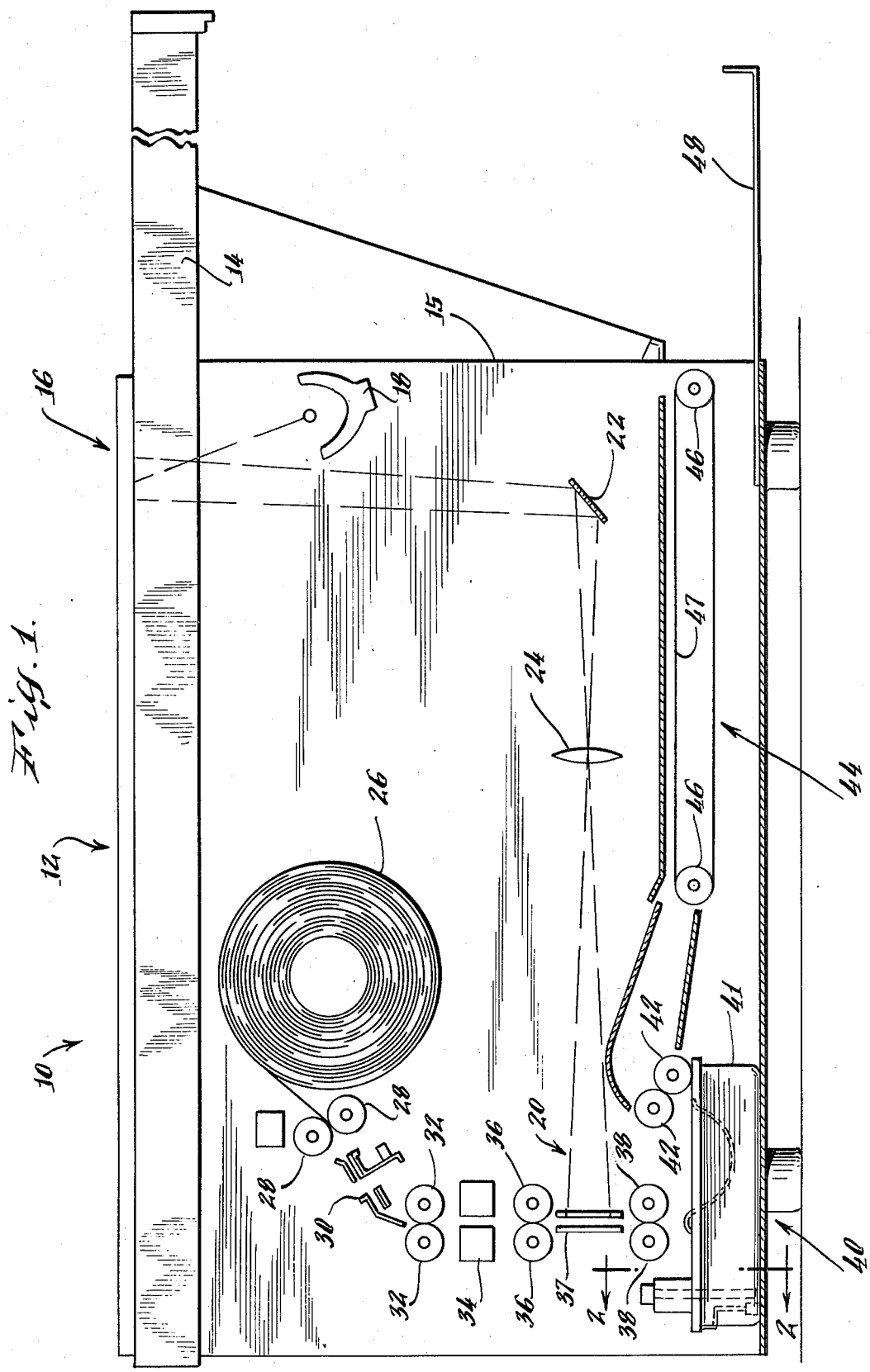

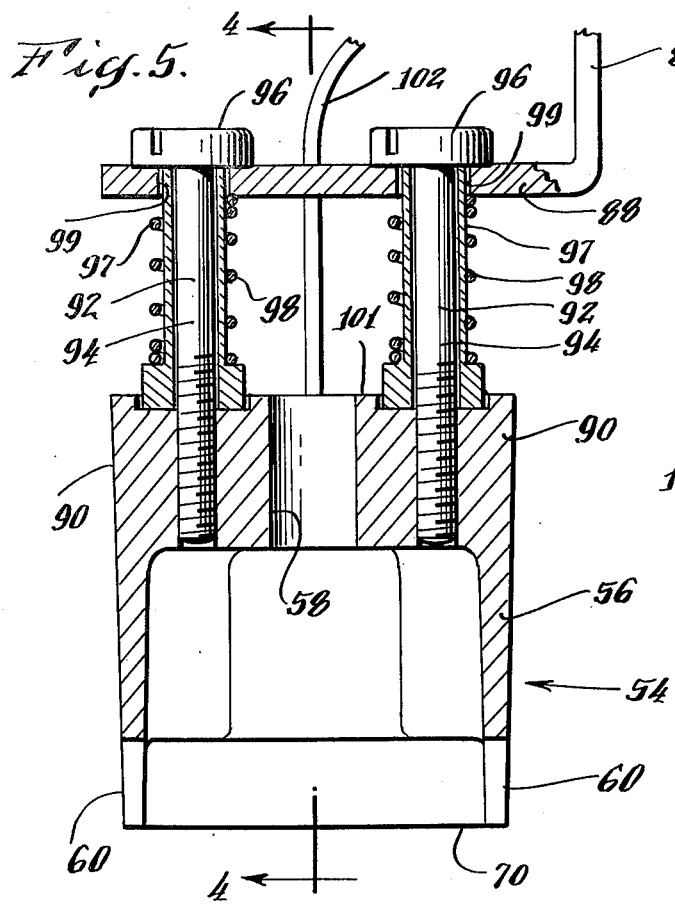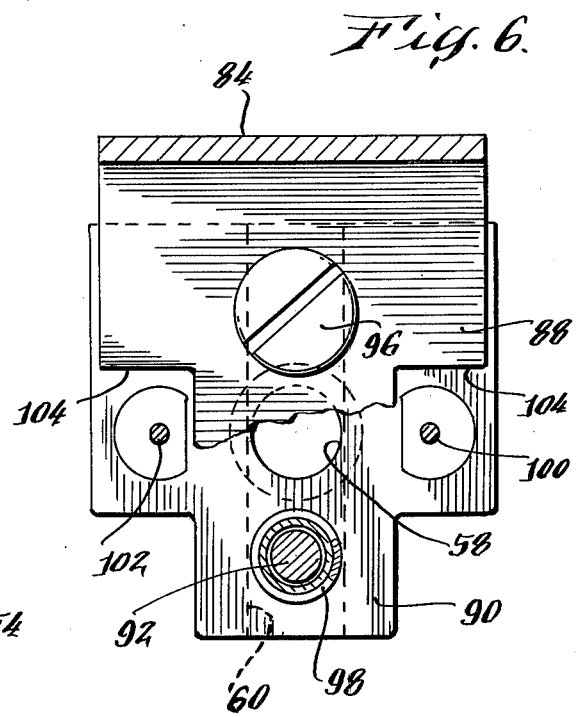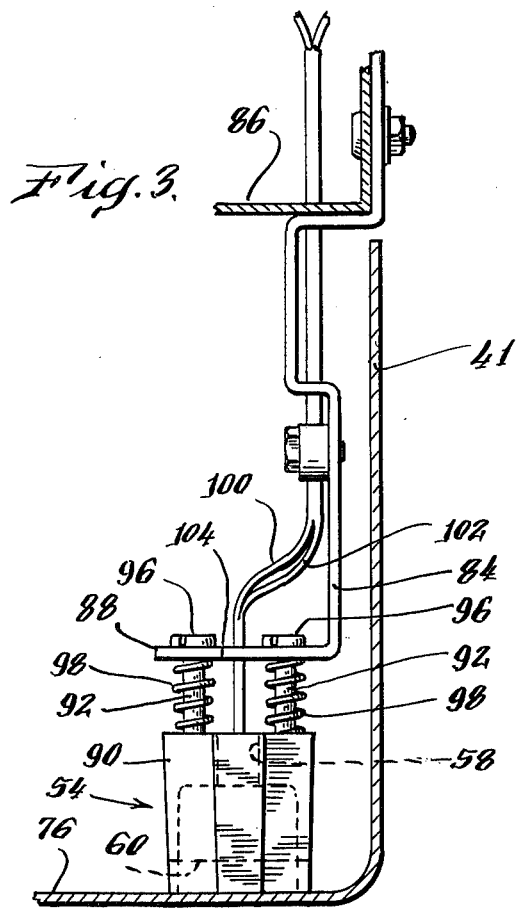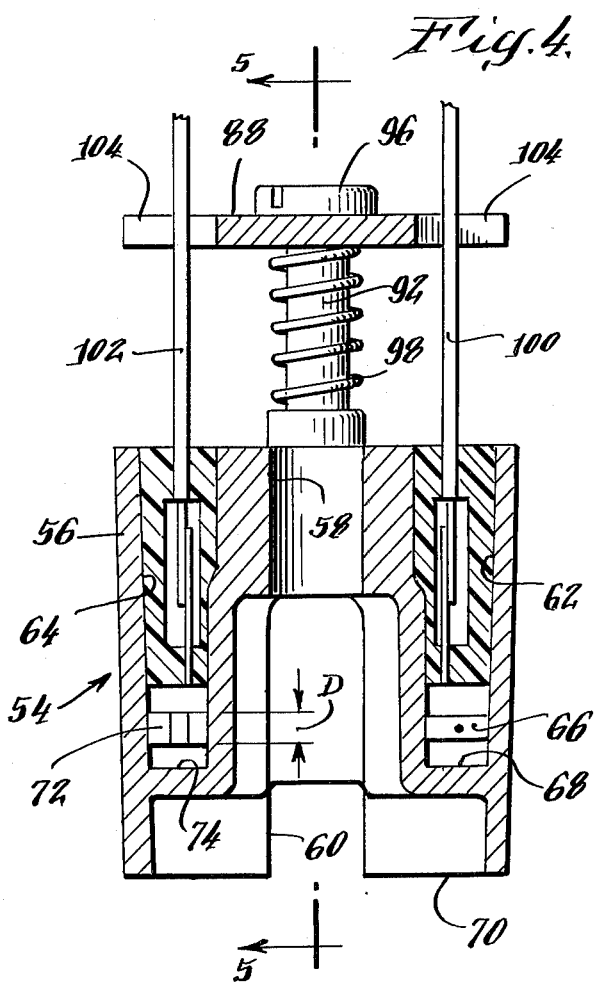

DEVELOPER SOLUTION LEVEL DETECTOR

BACKGROUND OF THE INVENTION

1. Field of the Invention

The present invention relates to a device for detecting and indicating when the level of developer solution, held for use in an electrostatic photocopying machine in a tank, falls to a predetermined level. With only this level remaining, more solution should be added to the tank before the machine is used again to insure its proper operation.

Photocopying machines are now in widespread use for reproducing all forms of documents. These machines are usually either of the dry toner type or wet, liquid toner type. In the machines of the second type a copy sheet having a photoconductive coating is uniformly electrostatically charged. The image of a document to be copied is then projected onto the charged copy sheet while at an imaging station. A conductive ground plate, forming part of the imaging station, is effective to allow discharge of selected areas of the sheet in accordance with the projected image. In this way, a latent electrostatic image, corresponding to the image of the document, is formed on the sheet. The latent image is developed by passing the sheet through a tank containing a toner or developer solution that carries a large number of particles charged oppositely to the charge of the latent image. Accordingly, the particles are attracted to the image areas on the sheet to later be fixed and dried in a well known manner and thereby yield a finished photocopy. The developer solution usually comprises a toner concentrate, which includes the chargeable toner particles, suspended in a carrier, and a diluting carrier, which may be the same as or is otherwise miscible with the concentrate carrier. (Note that the "developer solution" may, in fact, be a suspension of toner particles in the carrier. However, as used in this specification and the concluding claims, the term "developer solution" is intended to generically mean any solution or suspension of opaque or substantially opaque toner material carried in a liquid vehicle and used to electrostatically develop an image.)

Toner particles are removed from the developer solution each time a copy is made. Therefore, if developer solution is not added to the holding tank periodically, acceptable copies will not be made. That is, for copies to be adequately developed, the developer solution should be maintained above a predetermined minimum level. However, a practical problem in determining when solution should be added to the photocopying machine exists. Specifically, the solution holding tank has a fixed capacity. Moreover, premixed developer solution is usually packaged in containers having a standard volume. In order to maintain the concentration of toner particles in the solution within acceptable limits, the entire contents of the storage container should be added to the solution tank at one time. Therefore, if solution is added before an amount equal to the contents of the container has been depleted from the tank, the tank may over flow.

Accordingly, it is desirable to have an indication of when solution in the tank has reached the predetermined minimum level, which will allow the photocopying machine to make acceptable copies but which is also low enough to permit addition of the contents of a solution container without overflowing.

2. Description of the Prior Art

Various techniques for indicating the level of developer solution in an appropriate holding tank is a photocopying machine have been proposed in the past. For example, a typical technique uses a float of buoyant material which actuates a read switch when the solution level falls to a predetermined minimum operating level. However, this technique does not offer sufficient accuracy for use in photocopying apparatus which utilize a solution tank that is relatively shallow and has a relatively large surface area. In such tanks small changes in the level of liquid in them result when large changes in the volume of liquid, compared to the total capacity of the tank, occur. Accurate solution level detection is also difficult to obtain because the tank is frequently removable from the photocopying apparatus to permit maintenance. However, when reinstalled the physical relationship between the tank and the apparatus may change resulting in further inaccuracy of or requiring recalibration of the solution level detector. Moreover, it is difficult to find a suitable buoyant material which is inert with respect to or at least resistant to the developer solution.

A device for indicating developer solution level in a photocopying apparatus is disclosed in U.S. Pat. No. 3,468,604 (Matkovich et al.), assigned to the assignee of the patent invention. This device includes a source of light focused, through separate transparent containers of toner concentrate and its carrier, on separate fiber optical probes that terminate outside of the photocopying apparatus housing or cabinet. Since the toner concentrate and the carrier are poor light transmitters, light does not reach the probes until the level of the liquid falls to a selected level.

However, the Matkovich et al., system is used to indicate liquid levels in generally vertically arranged containers that define relatively small liquid surface areas. Therefore, relatively large changes in the volume of liquid, compared to the capacity of the containers, cause relatively large changes in the liquid level which are easily detected. Accordingly, a high degree of systematic accuracy is not required to determine when liquid level has reached its acceptable minimum value.

SUMMARY OF THE INVENTION

In the preferred embodiment, to be described below in detail, the device of the present invention accurately detects and indicates when the level of developer solution in a tank mounted in photocopying apparatus falls to a predetermined level. This predetermined level may be the minimum solution level which will permit the photocopying machine to make acceptable copies but which will also permit addition of the contents of a standard solution container without overflowing the tank in the machine. This device is particularly well adapted for measurement of solution levels in a shallow tank that defines a relatively large solution surface area in which small changes in solution level indicate large changes in solution volume when compared with the tank capacity. Moreover, this device is adapted for use in photocopying apparatus having removable developer solution tanks since it is immediately recalibrated each time the tank is reinstalled in the apparatus.

The device of the present invention is designed for use with a photocopying apparatus that uses a liquid, substantially opaque developer solution for developing photocopies. The apparatus is housed in a cabinet which supports the tank for holding the developer solution.

The device of the present invention includes a solution level sensor that comprises a source of light and a photosensor, which generates a light intensity signal related in a known way to the magnitude of light incident on it. Both the light source and photosensor are mounted in a housing, which has a bottom formed to rest firmly on the bottom of the tank, and, accordingly, are mounted in spaced relation relative to each other as well as to the housing bottom. The housing is formed so that a fixed thickness of developer solution may pass between the sensor and light source.

A bracket is mounted with the photocopying machine cabinet. The level sensor is linked to the bracket through several compressed coil springs that hold the sensor housing and tank bottoms in form interengagement so that the light source and photosensor are also spaced by a fixed distance from the tank bottom. This mounting arrangement automatically calibrates and recalibrates the level sensor by insuring proper positioning of the sensor housing and the tank.

A reference signal generator generates a reference signal that is related in an arbitrary manner to the light intensity signal generated by the photosensor when the developer solution in the tank is at its predetermined level. In particular, the reference signal may be equal to the generated light intensity signal when developer solution falls to a level where it is not present between the light source and photosensor. At this time, a marked increase of light reaches the photosensor.

A comparator is connected to both the photosensor and the reference signal generator and produces an output signal that indicates when the light intensity signal is greater or less than the reference signal. An indicator responsive to the output signal then signals an operator that more developer solution should be added to the tank.

The device of the present invention utilizes a photosensor which has a very small "window". That is, the photosensor has a very small physical dimension on which incident light creates a response. Accordingly, small changes in the level of developer solution in the holding tank can be the difference between covering and exposing the sensor to the light source, and therefore, may cause large changes in the response of the photosensor. Accordingly, the device of the present invention is extremely accurate even when used in photocopying apparatus that hold liquid developer solution in shallow tanks which define large solution surface areas.

Therefore, it is an object of the present invention to provide a device for indicating with a high degree of accuracy, when the level of developer solution in an electrostatic photocopying machine falls to a predetermined level. It is also an object of the invention to provide such a device, which may be used in photocopying apparatus having a removable developer solution tank, that is automatically recalibrated each time the tank is reassembled after being serviced.

Other objects, aspects, and advantages of the present invention will be pointed out in or will be understood from the following detailed description provided below in conjunction with the accompanying drawings.

BRIEF DESCRIPTION OF THE DRAWINGS

FIG. 1 is a schematic drawing of an illustrative photocopying apparatus in which the device of the present invention, for indicating when the level of developer solution therein falls below a predetermined level, is installed.

FIG. 3 is a side elevational view of the level sensor of the device as seen from an angle 90° displaced from FIG. 2.

FIG. 4 is an enlarged vertical cross-sectional view of the level sensor of the device taken through plane 4—4 in FIG. 5.

FIG. 5 is an enlarged vertical cross-sectional view of the level sensor of the device taken through plane 5—5 in FIG. 4.

FIG. 6 is a top plan view of the solution level sensor.

DETAILED DESCRIPTION OF THE PREFERRED EMBODIMENT

Figure 7:
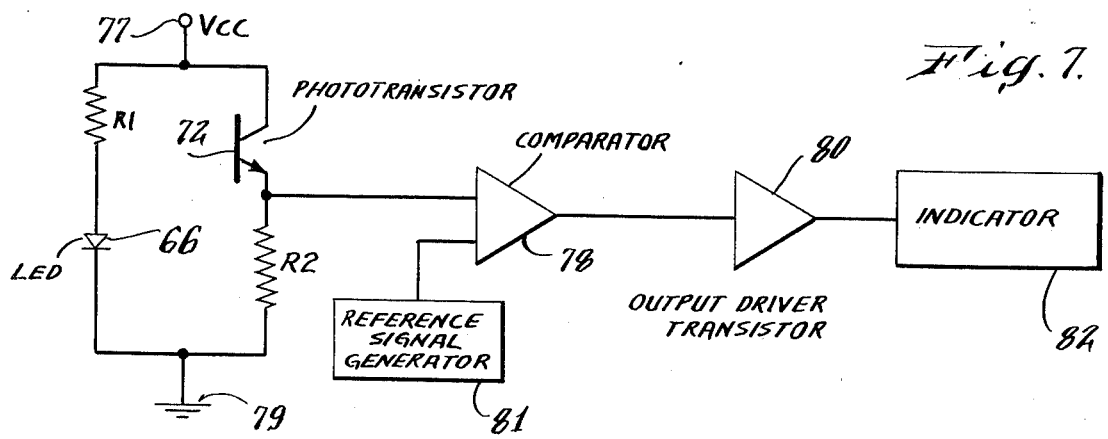
FIG. 7 is a diagrammatic representation of the device of the present invention.

FIG. 1 schematically illustrates an electrostatic photocopying machine, generally indicated at 10, that is equipped with a device constructed in accordance with the present invention for detecting and indicating when the level and, hence, amount of developer solution used in the machine falls to a predetermined value. As noted above, the developer solution is comprised of a toner concentrate and a main liquid toner carrier or vehicle. The toner concentrate comprises a large number of toner particles, which can be electrically charged, mixed in high concentration in a carrier that may be the same as or is at least miscible in the main solution carrier. The toner particles are opaque and contained in the solution in concentrations which render the solution's optical density significantly greater than clear air.

In order to understand the device of the present invention for detecting when developer solution falls to a predetermined level, it is helpful to first briefly describe an illustrative electrostatic photocopying machine in which it may be installed. This photocopying machine is described in detail in U.S. Pat. No. 3,738,743 (Hoffman et al.), assigned to the assignee of the present invention. Of course, the device may be used with machines which differ from that described in certain of its details. However, the basic principles of operation will remain the same from machine to machine.

The illustrative machine 10 may comprise a reciprocating document carriage, generally indicated at 12, which is mounted on elongated horizontal siderails 14 on top of the photocopier housing or cabinet 15 for reciprocal movement between a home position at the extreme right of FIG. 1 and a transfer position at the extreme left. This reciprocating document carriage may be of the type described in detail in U.S. Pat. No. 3,697,165 (Morriston et al.), assigned to the assignee of the present invention.

An original document bearing the image to be copied is placed faced down on the carriage and is reciprocated through an illuminating station, generally indicated at 16, that is illuminated by a light source 18 during the return of the carriage 12 from its transfer position to its home position. The illuminated original document image is projected onto an imaging station, generally indicated at 20, by means of a mirror 22 and a lens system, diagrammatically illustrated at 24.

Prior to projection of the document image, copy paper having a suitable photoconductive coating, such as "ELECTROFAX" paper having a zinc oxide coating on one side, is withdrawn from a supply roll 26 by initial feed rollers 28. The copy paper is cut into a desired sheet length, which usually corresponds to the length of the original document carrying the image being copied, by a knife mechanism 30. Thereafter, the paper is fed by a pair of feed rollers 32 to a charging device such as a corona charger 34 that uniformly charges the photoconductive coating on the sheet.

From the corona charger unit 34, a third pair of feed rollers 36 feeds the uniformly electrostatically charged copy paper to the imaging station 20. This imaging station includes a conductive ground plate 37 which is effective to allow discharge of selected areas on the photoconductive coating of the copy sheet when struck in accordance with the image of the original document. Moreover, the copy paper is fed through the imaging station in synchronism with movement of the document through the illuminating station. In this way, the entire document is scanned and projected in proportion onto the copy sheet. The image of the indicia born by the original document is thus transformed into a corresponding latent electrostatic image on the photoconductive coating of the copy paper. This latent electrostatic image is identified by the charged areas that remain on the copy sheet after non-image areas are permitted to discharge at the station 20.

The copy sheet is then fed by a fourth pair of rollers 38 through a development station, generally indicated at 40, where the latent electrostatic image is developed by the developer solution which is held in a tank 41 and which is described above. The toner particles in the solution are charged oppositely to the latent electrostatic image on the copy sheet and are, therefore, attracted to the electrostatic image in order to develop it in a well-known manner.

From the development station 40, a fifth pair of feed rollers 42 convey the developed copy sheet to a drying station, generally indicated at 44, where the developed image on the copy paper is fixed. Feed rollers 46 on which a transporting belt 47 is mounted ultimately convey the now developed copy sheet to a tray 48 where successive copies may be accumulated for removal by an operator.

Figure 2:
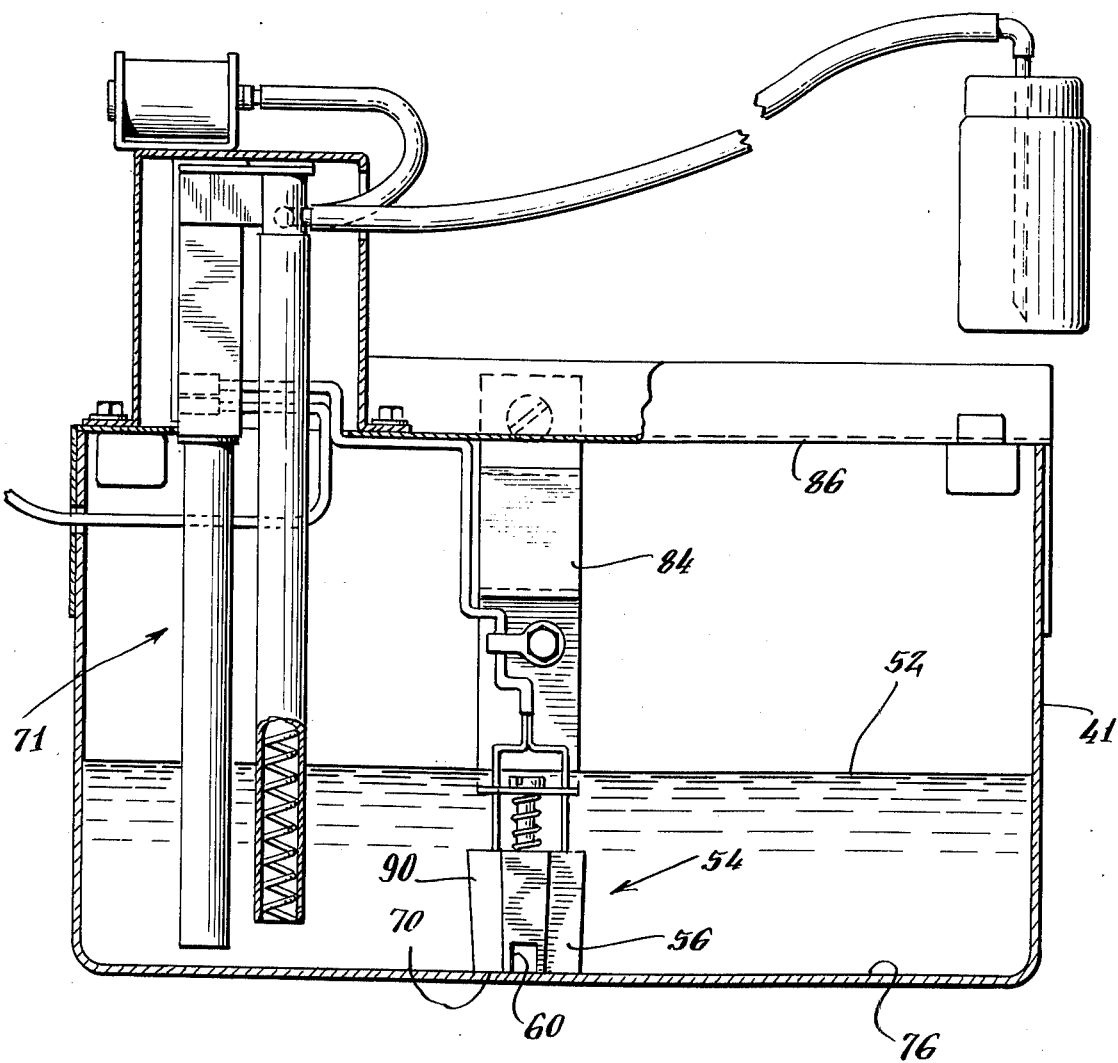
FIG. 2 is a vertical cross-sectional view taken through plane 2—2 in FIG. 1 illustrating the holding tank for the developer solution having certain components of the device of the present invention mounted therein.

As can be seen in FIGS. 1 and 2, the tank 41 is relatively shallow and defines a large solution surface area. Accordingly, small changes in the level of solution 52 are caused by relatively large changes, compared to the capacity of the tank, in the amount of solution contained therein. For example, the tank typically has a volume of 64 ounces, a depth of 2 inches, width of 11 inches and length of 5 inches. Further, developer solution is usually shipped and stored in containers having 32 ounce capacity. Therefore, if the container of solution is added to the tank when there are more than about 32 ounces already held therein, the tank will likely overflow. However, if less than 24 ounces of developer solution are present in the tank the photocopying apparatus will not operate properly. For example, the system for circulating the solution generally indicated at 71 (FIG. 2), which keeps toner particles in substantially uniform suspension in their carrier, will not operate properly. Therefore, it is important that more developer solution be added to the tank when its level is between 32 and 24 ounces. Accordingly, the preferred embodiment of the present invention is designed to detect when the level of toner in the toner tank is 28 ounces plus or minus 4 ounces.

As shown in detail in FIGS. 2 through 6, this device includes a toner level sensor, generally indicated at 54, which includes a sensor housing 56 molded from a suitable material, such as clear ABS resin, which is inert with respect to the developer solution. As shown in cross-sectional FIG. 4, the housing 56 is formed with a central, generally vertically extending passageway 58. Two generally horizontally extending passageways 60 formed at the base of housing 56 communicate with the central passageway 58. The horizontal passageways are located at the housing base to prevent turbulence in the tank from disturbing the output of the sensor and yielding a false reading. The vertical passageway prevents air pockets from forming in the sensor housing. In addition, the side walls of the passageway 58 extend below to sensor and light source to insulate them from turbulence in the tank and thereby prevent a false reading. The housing 56 is also formed with two generally vertically extending cavities 62 and 64 in which the operating components of the detector are mounted. A light source 66, for example a light emitting diode (LED), is encapsulated in cavity 62 by a suitable resinous material such as clear epoxy resin which is also inert with respect to the toner. Further, cavity 62 is provided with a base 68 against which the LED 66 is positioned so that it is spaced by a fixed distance from the bottom 70 of the sensor housing 56.

A photodetector 72, for example a phototransistor, is similarly mounted in cavity 64, is encapsulated therein by, for instance, epoxy resin, and is positioned against the base 74 thereof to establish a similar fixed distance between it and the bottom 70 of housing 56. As shown in FIG. 4 the phototransistor and LED are spaced by a fixed distance from each other. Accordingly, light emitted from the LED 62 traverses a path to the phototransistor 72 which is substantially parallel to the bottom of housing 70.

The phototransistor operates in a manner described below to generate a light intensity signal indicative of the magnitude of light incident on it. This signal may be substantially zero when zero light strikes the phototransistor, and a large value when substantial light strikes the phototransistor.

As shown in FIG. 2, the level sensor is mounted in a manner to be described in greater detail below, so that its bottom 70 firmly engages the bottom 76 of tank 41. Therefore, the LED 62 and phototransistor 72 are also mounted a fixed distance from the bottom 76. This fixed distance is defined, then as the predetermined level which when reached by the developer solution triggers the liquid level sensor to provide an indication that more solution should be added to the tank.

The developer solution is substantially opaque as noted above. Further, when the level of solution is such that the level sensor is inundated in the tank, solution may enter the vertical passage 58 through the lateral passages 60, defining a thickness equal to that of passage 58, to obstruct the light emitted from the LED and prevent its incidence on the transistor. However, when the liquid level falls beneath the line between the LED and phototransistor, light emitted from the LED can reach the phototransistor at the predetermined level. At this time, an indication is given in a manner described below with reference to FIG. 7 which diagrammatically illustrates the device of the present invention. As shown there, the LED 66 and phototransistor 72 are each connected in series with a resistor $R_1$ and $R_2$ respectively. The phototransistor and resistor $R_2$ are then connected in parallel with the LED and resistor $R_1$ across a source of voltage 77 and ground 79. Current flow through the phototransistor 72 is very low until it is caused to conduct when sufficient light strikes it from the LED. This event, of course, occurs when the developer solution level drops to a point below the phototransistor, that is, drops to the predetermined level. When current flow through phototransistor 72 suddenly increases, the voltage or light intensity signal across resistor $R_2$ also increases. The phototransistor and resistor $R_2$ are connected to a comparator 78 that accordingly receives the light intensity signal. The comparator is also connected to a reference signal generator 81 which generates a reference voltage or signal that is selected at an arbitrary high value which is greater than the output signal before phototransistor 72 is in a conducting state but lower than the output signal after phototransistor is in a conducting state. Therefore, when the phototransistor switches to a conducting state indicating that developer solution has fallen to the predetermined level, the comparator generates a high output signal which is conducted to an output driver 80 for amplification. The output driver is, in turn, connected to an indicating device 82 which may be an aural or a visual indicator such as a buzzer or an LED which is accessible from the exterior of the photocopier housing. In this manner, when the developer solution level in tank 41 reaches the predetermined level an indication is given to the operator that more solution must be added.

As can be seen from the above description, the arbitrary reference signal is related in a known way to the light intensity signal generated by the phototransistor, which is dependent on the developer solution level, in a predetermined manner. The comparator is arranged to generate an output signal when it detects this relationship between the respective signals to yield the indication of interest.

The device of the present invention is also designed to be automatically recalibrated when the developer tank is removed from the photocopying machine for maintenance or for any other reason and then reinstalled. In particular, as shown on FIGS. 2 and 3, the liquid level sensor is supported by a resilient mount that includes a bracket 84 which is fixed to a platform 86 mounted with the cabinet 15 of the photocopying machine. At its lower end, bracket 84 is formed with a sidewardly directed tab 88. The tank 41 is operatively positioned beneath platform 86.

As shown in greater detail on FIGS. 5 and 6, the level detector housing 56 is formed with two sidewardly directed lugs 90 each of which receives an elongated pin or screw 92. Each pin has a shank 94 that passes through a suitable hole 99 in the bracket tab 88 and is secured in one lug 90 of detector housing 56. An enlarged head 96 on each pin limits the downward travel of it and, hence, the detector housing 56 with respect to the tab 88. The shank 24 of each pin 92 also passes through a sleeve 97 which defines the vertical distance between the pin head 96 and the top 101 of housing 56. Further, a resilient mount is provided by coil springs 98 that encircle sleeves 97 and are compressed between the tab 88 and the top 101 of the detector housing 56 to urge the housing downwardly. The pins have length and the springs have a spring constant sufficient to urge the sensor housing bottom 70 into firm engagement with the tank bottom 76 each time the tank is repositioned. In this way, the predetermined distance between the phototransistor and the tank bottom is re-established and maintained at a constant value regardless of how many times the tank 41 is removed or reinstalled in the photocopying apparatus. Leads 100 and 102 from the LED 66 and phototransistor 72 respectively also pass freely through notches 104 in tab 88 and do not, then, interfere with the spring loaded movement of housing 56.

The device of the present invention, described above in detail, provides a high degree of accuracy for several reasons. First, the predetermined distance between the phototransistor and the bottom of the tank, and, therefore, the predetermined level solution at which indication is given, are maintained at a constant value by the spring load sensor housing mount. Second, the phototransistor has a small physical dimension, that is the dimension perpendicular to the surface of the solution, over which it is responsive. In particular, as shown in FIG. 4, the vertical dimension D of the phototransistor is approximately 0.04 inches. Therefore, changes in the solution level of 0.04 inches at the phototransistor will cause it to change its output condition. Accordingly, it is preferable that dimension D be with the range of 0.02 to 0.06 inches. Thus, it will be appreciated from the above description that the apparatus of the present invention is extremely accurate even in compact machines having relatively shallow developer solution tanks which define a relatively large solution surface area. Moreover, the tank may be made removable for easy maintenance of the machine when the device of the present invention is used since the device is immediately recalibrated for proper detection of falling of the developer solution level below its predetermined level.

Accordingly, although a specific embodiment of the present invention has been described above in detail, it is to be understood that this is for purposes of illustration. Modifications may be made to the described developer solution level detector by those skilled in the art in order to adapt this detector to particular applications.

What is claimed is:

1. In a photocopying apparatus which utilizes a liquid developer solution that is stored in a removable tank for developing photocopies; a device for indicating when the amount of developer solution in the tank falls to a predetermined level so that a predetermined amount of developer solution may be added to said tank, said device comprising:
   A. a source of light;
   B. photosensor means, on which said light source is focused, for generating a light intensity signal only when developer solution is not between said light source and photosensor;
   C. first means for mounting said light source and said photosensor means at a fixed distance from the bottom of the tank when they are properly located in the photocopying apparatus, the fixed distance being substantially equal to the predetermined level; and
   D. second means for automatically repositioning said first means at said fixed distance from the bottom of the tank each time that the removable tank is reinserted in the photocopying apparatus whereby the light source and photosensor are recalibrated to consistently sense substantially the same predetermined level, and
   E. means responsive to said light intensity signal for indicating when developer solution is not between said light source and photosensor means to thereby indicate when the amount of solution has fallen below the predetermined level.

2. The device for indicating when the amount of developer solution in a tank in a photocopying apparatus falls to a predetermined level as claimed in claim 1 wherein said first means comprises:
a housing which defines:
1. a first cavity in which said light source is mounted;
2. a second cavity in which said photosensor means is mounted;
3. a fixed space between said first and second cavities and, therefore, between said light source and photosensor means; and
4. a passageway within said fixed space through which developer solution may flow.

3. The device for indicating when the amount of developer solution in a tank in a photocopying apparatus falls to a predetermined level as claimed in claim 2 wherein said housing passageway comprises:
a generally vertical passageway portion that prevents formation of air pockets therein and thereby prevents false readings from said photosensor.

4. The device for indicating when the amount of developer solution in a tank in a photocopying apparatus falls to a predetermined level as claimed in claim 3 wherein said vertical passageway portion has sidewalls extending below said photosensor and light source to insulate them from turbulence in the tank.

5. The device for indicating when the amount of developer solution in a tank in a photocopying apparatus falls to a predetermined level as claimed in claim 2 wherein said housing is formed with a bottom and said light source and photosensor means are both mounted a fixed distance substantially equal to the predetermined level from said bottom and wherein said second means further comprises:
resilient means for firmly holding the bottom of said housing against the bottom of the tank.

6. The device for indicating when the amount of developer solution in a tank in a photocopying apparatus falls to a predetermined level as claimed in claim 5 wherein said first means further comprises:
a bracket mounted with the photocopying apparatus, said resilient means interconnecting said bracket and said housing.

7. The device for indicating when the amount of developer solution in a tank in a photocopying apparatus falls to a predetermined level as claimed in claim 1 wherein the dimension of said photosensor means extending in a direction perpendicular to the surface of developer solution in the tank within which said photosensor means is sensitive to changes of the magnitude of light thereon is between 0.02 and 0.06 inch.

8. The device for indicating when the amount of developer solution in a tank in a photocopying apparatus falls to a predetermined level as claimed in claim 1 wherein said photosensor means comprises a phototransistor which generates a light intensity signal indicative of the magnitude of light incident on it.

9. The device for indicating when the amount of developer solution in a tank in a photocopying apparatus falls to a predetermined level as claimed in claim 8 wherein said responsive means comprises:
1. a reference signal generator which generates an arbitrary reference signal related in a known way to the light intensity signal generated by the phototransistor when the developer solution is at the predetermined level; and
2. a comparator connected to both said phototransistor and said reference signal generator to generate an output signal when said light intensity signal is related to said reference signal in the known way.

10. The device for indicating when the amount of developer solution in a tank in a photocopying apparatus falls below a predetermined level as claimed in claim 1 wherein said light source comprises a light emitting diode.

11. In a photocopying apparatus which utilizes a liquid, substantially opaque developer solution for developing photocopies, the apparatus being housed in a cabinet which supports a removable tank for holding the developer solution; a device for indicating when the level of developer solution in the tank falls to a predetermined level so that a predetermined amount of developer solution may be added to said tank, said device comprising;
A. a level sensor including:
1. a source of light;
2. a photosensor which generates a light intensity signal related in a known way to the magnitude of light incident on it; and
3. a housing, having a bottom formed to rest firmly on the bottom of tank, in which both said light source and said photosensor are mounted in spaced relation relative to each other and relative to the housing bottom, said housing defining a passageway between said photosensor and light source through which solution may pass;
B. first means mounted with the photocopier cabinet for supporting said level sensor housing in the tank;
C. second, resilient means for automatically repositioning said level sensor housing to firmly engage said housing bottom with said tank bottom each time that the removable tank is reinserted in the photocopying apparatus whereby the level sensor consistently senses substantially the same predetermined level;
D. reference signal generating means for generating an arbitrary reference signal related in a known way to the light intensity signal generated by said photosensor when the developer solution in the tank is at the predetermined level; and
E. comparator means connected to said photosensor and said reference signal generating means for generating an output signal when the reference signal is related in the known way to the light intensity signal.

12. The device for indicating when the amount of developer solution in a tank in a photocopying apparatus falls to a predetermined level as claimed in claim 11 wherein said housing comprises:
1. a first cavity in which said light source is mounted; and
2. a second cavity in which said photosensor means is mounted.

13. The device for indicating when the amount of developer solution in a tank in a photocopying apparatus falls to a predetermined level as claimed in claim 12 wherein said housing passageway comprises:
a generally vertical passageway portion that prevents formation of air pockets therein and thereby prevents false readings from said photosensor.

14. The device for indicating when the amount of developer solution in a tank in a photocopying apparatus falls to a predetermined level as claimed in claim 13 wherein said vertical passageway portion has sidewalls extending below said photosensor and light source to insulate them from turbulence in the tank.

15. The device for indicating when the amount of developer solution in a tank in a photocopying apparatus falls to a predetermined level as claimed in claim 11 wherein said first means comprises a bracket mounted with the photocopying apparatus; and said second resilient means comprises a spring for interconnecting said bracket and said housing.

16. The device for indicating when the amount of developer solution in a tank in a photocopying apparatus falls to a predetermined level as claimed in claim 11 wherein the dimension of said photosensor means extending in a direction perpendicular to the surface of developer solution in the tank within which said photosensor means is sensitive to changes of the magnitude of light thereon is between 0.02 and 0.06 inch.

17. The device for indicating when the amount of developer solution in a tank in a photocopying apparatus falls to a predetermined level as claimed in claim 11 wherein said photosensor means comprises a phototransistor.

18. The device for indicating when the amount of developer solution in a tank in a photocopying apparatus falls to a predetermined level as claimed in claim 17 wherein said responsive means comprises:
1. a reference signal generator which generates a reference signal related in a known way to the light intensity signal generated by the phototransistor when the developer solution is at the predetermined level; and
2. a comparator connected to both said phototransistor and said reference signal generator to generate an output signal when said light intensity signal is related to said reference signal in the known way.

19. The device for indicating when the amount of developer solution in a tank in a photocopying apparatus falls below a predetermined level as claimed in claim 11 wherein said light source comprises a light emitting diode.

* * * * *